US009466286B1

(12) United States Patent
Hart et al.

(10) Patent No.: US 9,466,286 B1
(45) Date of Patent: Oct. 11, 2016

(54) TRANSITIONING AN ELECTRONIC DEVICE BETWEEN DEVICE STATES

(71) Applicant: Amazon Technologies, Inc., Reno, NV (US)

(72) Inventors: Gregory Michael Hart, Mercer Island, WA (US); William Folwell Barton, Harvard, MA (US); Jeffrey P. Bezos, Greater Seattle, WA (US)

(73) Assignee: Amazong Technologies, Inc., Seattle, WA (US)

( * ) Notice: Subject to any disclaimer, the term of this patent is extended or adjusted under 35 U.S.C. 154(b) by 598 days.

(21) Appl. No.: 13/743,259

(22) Filed: Jan. 16, 2013

(51) Int. Cl.
*G10L 15/00* (2013.01)

(52) U.S. Cl.
CPC ...................... *G10L 15/00* (2013.01)

(58) Field of Classification Search
USPC .................................. 704/246–252
See application file for complete search history.

(56) References Cited

U.S. PATENT DOCUMENTS

| 4,959,864 | A | * | 9/1990 | Van Nes | G10L 15/22 704/251 |
| 7,418,392 | B1 | | 8/2008 | Mozer et al. | |
| 7,720,683 | B1 | | 5/2010 | Vermeulen et al. | |
| 7,774,204 | B2 | | 8/2010 | Mozer et al. | |
| 8,548,806 | B2 | * | 10/2013 | Nagashima | 704/251 |
| 8,972,264 | B2 | * | 3/2015 | Chien | 704/251 |
| 2003/0040907 | A1 | * | 2/2003 | Chang et al. | 704/231 |
| 2003/0236664 | A1 | * | 12/2003 | Sharma | 704/251 |
| 2005/0071161 | A1 | * | 3/2005 | Shen | 704/236 |
| 2012/0223885 | A1 | | 9/2012 | Perez | |
| 2013/0185072 | A1 | * | 7/2013 | Huang et al. | 704/246 |
| 2013/0289996 | A1 | * | 10/2013 | Fry | 704/257 |
| 2013/0311184 | A1 | * | 11/2013 | Badavne et al. | 704/250 |

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Leonard Saint Cyr
(74) *Attorney, Agent, or Firm* — Lee & Hayes, PLLC

(57) ABSTRACT

This disclosure describes techniques for transitioning an electronic device between device states. In one example, a voice-controlled device is configured to transition from a low power state to an interactive state in response to identifying a user speaking a defined utterance. If, however, the device determines that the user has spoken an utterance that is close, but not equivalent to, the defined utterance, then the device may lower a threshold for subsequent speech such that the device is more likely to determine that the subsequent speech is equivalent to the defined utterance.

27 Claims, 11 Drawing Sheets

TRANSITIONING AN ELECTRONIC DEVICE BETWEEN DEVICE STATES

BACKGROUND

Homes are becoming more connected with the proliferation of computing devices such as desktops, tablets, entertainment systems, and portable communication devices. As computing devices evolve, many different ways have been introduced to allow users to interact with these devices, such as through mechanical means (e.g., keyboards, mice, etc.), touch screens, motion, and gesture. Another way to interact with computing devices is through speech.

When interacting with a device through speech, a device may perform automatic speech-recognition (ASR) on audio signals generated from sound captured within an environment for the purpose of identifying voice commands within the signals. In some instances, taking into account previous speech from a user may aid the device in accurately recognizing subsequent speech from the user.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
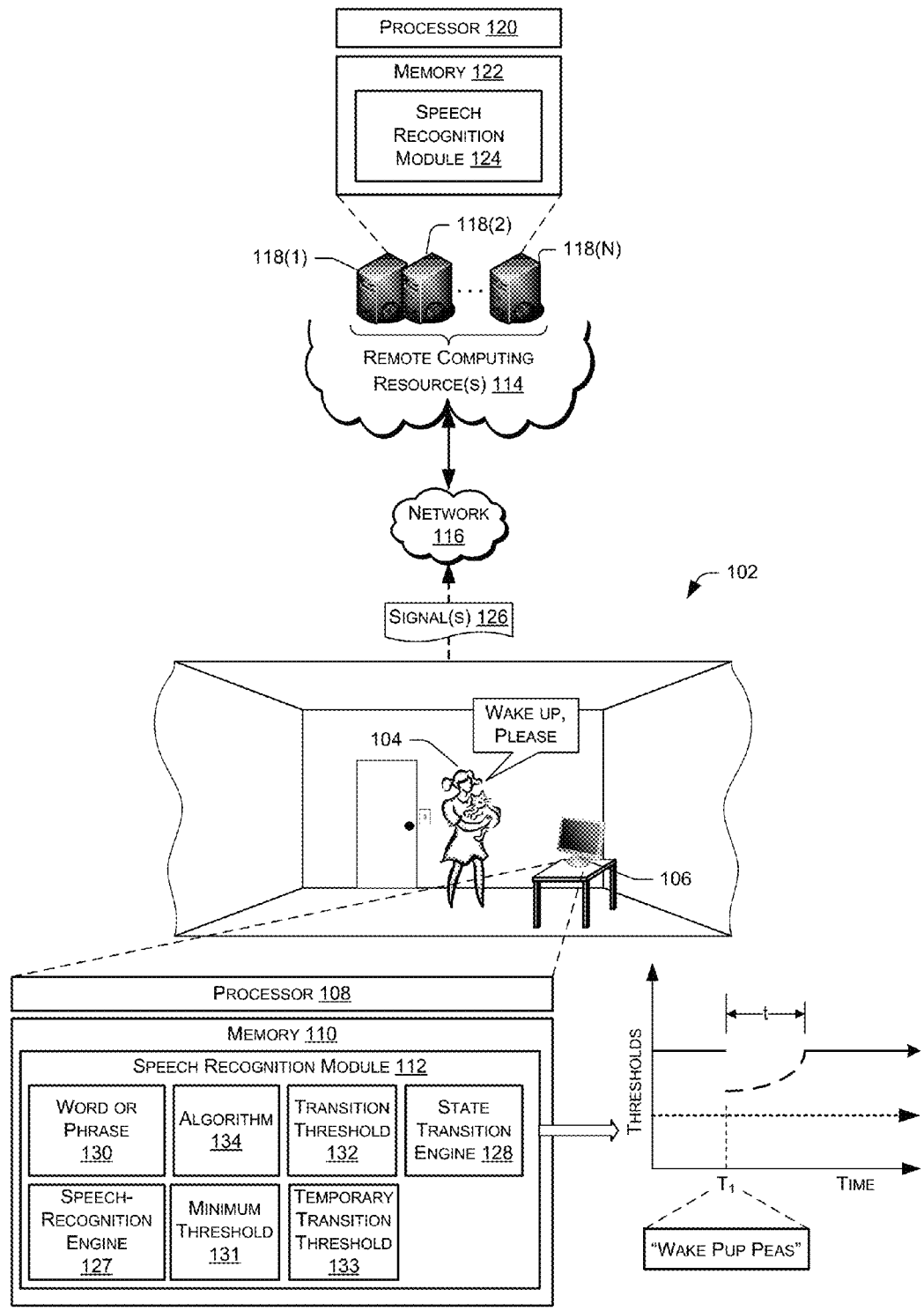
FIG. 1 shows an illustrative voice interaction computing architecture set in a home environment, in accordance with an implementation.

This disclosure describes techniques for transitioning an electronic device, such as a voice-controlled device, between device states based on a user utterance. The device may transition between states based on an identification of a user uttering a defined word or phrase (e.g., "wake up, please"). The first state may be, for example, a low power state in which limited automatic speech-recognition (ASR) is performed on the voice-controlled device. The second state may be, for example, a fully interactive state in which the voice-controlled device responds to a series of user commands and/or communicates with remote computing resources.

To enhance the ability for a user to cause the device to transition states, if the voice-controlled device receives a user utterance that is close to, but does not match, the defined word or phrase, the voice-controlled device may, for a defined amount of time, lower the acceptance criterion needed to cause the device to transition between states. If the user again utters the defined word or phrase during the defined amount of time, with the lowered acceptance criterion the device will be more likely to accept the utterance and transition between states. Temporarily lowering the acceptance criterion when the device detects a potential utterance of the defined word or phrase will reduce the probability of a user having to repeatedly utter the defined word or phrase without increasing transitions of the device that were not intended.

In one example, a voice-controlled device is configured to operate in at least two different states. In a first state, a microphone unit of the voice-controlled device captures sound from an environment in which the voice-controlled device resides, generates corresponding audio signals, and then locally performs ASR on the audio signals. The voice-controlled device then compares results of the ASR to a defined a word or phrase that, upon recognition of, causes the voice-controlled device to transition from the first state to a second state.

In the second state, the voice-controlled device is configured to provide audio signals generated based on sound captured in the environment to a network-based computing platform. Computing resources of the network-based computing platform then perform ASR on the audio signals to identify a broad array of commands from speech indicated by the audio signals. Upon identifying a command, the computing resources of the platform may provide an instruction and/or content back over the network to the voice-controlled device, or another component, which may output audio to the user in response.

As described above, the voice-controlled device may transition from the first state to the second state in response to identifying a defined word or phrase. That is, the voice-controlled device may transition from the first state to the second state in response to identifying user speech that has a similarity to the defined word or phrase that is greater than a transition threshold. "Defined" or "determined" values, such as a defined word or phrase or a defined amount of time, etc., may be set by a manufacturer of the voice-controlled device, a user, a remote computing system, another external source, etc.

As described in detail below, the voice-controlled device may alter this transition threshold in response to identifying a user speaking a word or phrase identified as having a similarity that is less than, but close to, the transition threshold. As an alternative, also as discussed below, a temporary threshold may be implemented in response to identifying a user speaking a word or phrase having a similarity that is less than, but close to, the transition threshold.

For instance, envision that a voice-controlled device is configured to transition from the first state to the second state in response to the user saying the phrase "wake up, please." Envision further that the user states the phrase "wake up, please" and that the voice-controlled device captures sound including this phrase, generates a corresponding audio signal, and performs ASR on the audio signal. In this example, the voice-controlled device may interpret the user's speech as something other than "wake up, please" due to background noise, clarity of the user's speech or the like. In this example, envision that the voice-controlled device recognizes the user's speech, or utterance, as "wake pup peas" rather than "wake up, please."

After identifying the utterance, the voice-controlled device may compare the utterance to a representation of a defined word or phrase and calculate a similarity score identifying a similarity between the utterance and the defined word or phrase. The similarity score may be any number or other identifier that is used to illustrate a similarity between the defined word or phrase and the utterance. In this example, the voice-controlled device may calculate a similarity score that is less than an acceptance criterion, but close to the acceptance criterion. The acceptance criterion may be one or more factors that are considered when determining whether to transition a device from a first state to a second state. For example, the acceptance criterion may be a transition threshold that when satisfied will cause the device to transition from a first state to a second state.

In the example of the acceptance criterion including a transition threshold, it may be determined whether the similarity score is close to the transition threshold. For example, a minimum threshold may exist and if the similarity score meets or exceeds the minimum threshold, it may be considered to be close to the transition threshold. If the similarity score is close to the transition threshold, the voice-controlled device may lower a value of the transition threshold for a determined amount of time such that subsequent speech is more likely to be interpreted by the voice-controlled device as the defined word or phrase, resulting in the voice-controlled device transitioning to the second state. In some implementations, the transition threshold itself may be lowered or a temporary transition threshold may be established and used as the transition threshold for the determined amount of time.

In this example, for instance, envision that the user again speaks the phrase "wake up, please" after the voice-controlled device has lowered the value of the transition threshold or established a temporary transition threshold. Envision also that the voice-controlled device calculates a similarity score between this second utterance and the defined word or phrase that is less than an initial transition threshold, but greater than the lowered or temporary transition threshold. As such, the voice-controlled device may transition to the second state and, therefore, may begin communicating generated audio signals to the network-based computing platform. If, however, the user did not again state the phrase "wake up, please" (e.g., because the user was not initially trying to "wake up" the voice-controlled device), then after the determined amount of time the value of the transition threshold may return to its initial transition threshold value or the temporary transition threshold removed.

By taking into account the previous speech of a user, the voice-controlled device may more accurately transition to the second state and reduce frustration of the user attempting to wake or activate the voice-controlled device. In some instances, the voice-controlled device may perform actions in addition to lowering the value of the transition threshold. For instance, the voice-controlled device may attenuate or turn off any audio that the voice-controlled device is outputting, may indicate to the user (e.g., via audio, lights, etc.) that the voice-controlled device believes that the user is attempting to wake the voice-controlled device, or the like.

The devices and techniques described above and below may be implemented in a variety of different architectures and contexts. One non-limiting and illustrative implementation is described below.

FIG. 1 shows an illustrative voice interaction computing architecture set in a home environment 102 that includes a user 104. The architecture also includes an electronic voice-controlled device 106 with which the user 104 may interact. In the illustrated implementation, the voice-controlled device 106 is positioned on a table within a room of the home environment 102. In other implementations, it may be placed in any number of locations (e.g., ceiling, wall, in a lamp, beneath a table, under a chair, etc.). Further, more than one voice-controlled device 106 may be positioned in a single room, or one voice-controlled device may be used to accommodate user interactions from more than one room. For example, the voice-controlled device 106 may be located in one room and be in wired and/or wireless communication with a microphone and/or lights positioned in another room such that a user can interact with the voice-controlled device from either room.

Generally, the voice-controlled device 106 has a microphone unit that includes at least one microphone and a speaker unit that includes at least one speaker to facilitate audio interactions with the user 104 and/or other users. In some instances, the voice-controlled device 106 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power-on/off, etc.). Nonetheless, the primary and potentially only mode of user interaction with the voice-controlled device 106 may be through voice input and audible output. One example implementation of the voice-controlled device 106 is provided below in more detail with reference to FIG. 11. While the voice-controlled device is described herein as an electronic device with limited components, in other implementations, the voice controlled device may be, or may be incorporated into, any type of electronic device. For example, the voice-controlled device may be a portable device, such as a cell phone, tablet, laptop, desktop, etc., a stationary device, such as television, desktop computer, etc., or any other type of electronic device capable of supporting or providing the implementations described herein.

The microphone unit of the voice-controlled device 106 detects or receives audio from the environment 102, such as sounds uttered from the user 104, and generates a corresponding audio signal. As illustrated, the voice-controlled device 106 includes a processor 108 and memory 110, which stores or otherwise has access to a speech-recognition module 112. As used herein, a processor may include multiple processors and/or a processor having multiple cores. As discussed further below, may include a speech-recognition engine 127 that performs speech-recognition on audio signals generated by the microphone unit, such as utterances spoken by the user 104. The voice-controlled device 106 may perform certain actions in response to recognizing different speech from the user 104. The user may speak defined commands (e.g., "Wake up, please," "Sleep," etc.), or may use a more casual conversation style when interacting with the voice-controlled device 106 (e.g., "I'd like to go to a movie. Please tell me what's playing at the local cinema.").

In some instances, the voice-controlled device 106 may operate in conjunction with or may otherwise utilize computing resources 114 that are remote from the environment 102. For instance, the voice-controlled device 106 may couple to the remote computing resources 114 over a network 116. As illustrated, the remote computing resources 114 may be implemented as one or more servers 118(1), 118(2), . . . , 118(N) and may, in some instances, form a portion of a network-accessible computing platform implemented as a computing infrastructure of processors, storage, software, data access, and so forth that is maintained and accessible via a network such as the Internet. The remote computing resources 114 do not require end-user knowledge of the physical location and configuration of the system that delivers the services. Common expressions associated for these remote computing devices 114 include "on-demand computing," "software as a service (SaaS)," "platform computing," "network-accessible platform," "cloud services," "data centers," and so forth.

Each of the servers 118(1)-(N) include a processor 120 and memory 122, which may store or have access to a speech-recognition module 124 for receiving audio signals from the voice-controlled device 106, recognizing speech and, potentially, causing performance of an action in response. The speech-recognition module 124 may include a speech-recognition engine, one or more speech models, and/or a training module. The speech-recognition engine may use techniques including but not limited to keyword spotting techniques and large vocabulary speech-recognition to recognize speech. For example, a keyword spotting technique may determine whether or not a specific word was spoken by comparing an utterance to a model, such as a hidden Markov model (HMM), representing the specific word. Large vocabulary speech-recognition may determine which words were spoken using an acoustic model and a language model. An acoustic model may model phonemes (or other subword units such as phonemes in context or syllables) by using an acoustic model for each phoneme. A language model may model probabilities of words appearing in sequence using techniques such as an n-gram language model. A hidden Markov model (for either keyword spotting or large vocabulary speech-recognition) may comprise a sequence of states and the states may be further modeled with one or more Gaussian mixture models. To compare an utterance to the models, features may be extracted from the utterance (such as mel-frequency cepstral coefficients or perceptual linear prediction features) and these features may be aligned with the states of the hidden Markov model using a Viterbi algorithm. In addition, the speech-recognition module 124 may utilize the training module to retrain or adapt one or more speech models based on interaction with a user. For example, the parameters of a hidden Markov model and/or a Gaussian mixture model may be adapted using maximum a posteriori adaptation.

In some instances, as described below, the voice-controlled device 106 may upload audio signals 126 to the remote computing resources 114 for processing, given that the remote computing resources 114 may have a computational capacity that far exceeds the computational capacity of the voice-controlled device 106. Therefore, the voice-controlled device 106 may utilize the speech-recognition module 124 at the remote computing resources 114 for performing relatively complex analysis on audio captured from the environment 102.

Regardless of whether the speech-recognition occurs locally or remotely from the environment 102, the voice-controlled device 106 may receive vocal input (an utterance) from the user 104. The voice-controlled device 106 and/or the resources 114 may perform speech-recognition on the utterance to interpret a user's operational request or command. The requests may be for essentially any type of operation, such as authentication, database inquires, requesting and consuming entertainment (e.g., gaming, finding and playing music, movies or other content, etc.), personal management (e.g., calendaring, note taking, etc.), online shopping, financial transactions, and so forth.

The voice-controlled device 106 may communicatively couple to the network 116 via wired technologies (e.g., wires, USB, fiber optic cable, etc.), wireless technologies (e.g., RF, IR, cellular, satellite, Bluetooth, etc.), or other connection technologies. The network 116 is representative of any type of communication network, including data and/or voice network, and may be implemented using wired infrastructure (e.g., cable, CAT5, fiber optic cable, etc.), a wireless infrastructure (e.g., RF, IR, cellular, microwave, satellite, Bluetooth, etc.), and/or other connection technologies.

As illustrated, the memory 110 of the voice-controlled device 106 stores or otherwise has access to the speech-recognition module 112, which includes a state transition engine 128 configured to transition the voice-controlled device 106 between different device states. For instance, the state transition engine 128 may transition the voice-controlled device 106 from a state in which the speech-recognition engine 127 is performing ASR locally to identify a defined word or phrase 130 to a state in which the voice-controlled device 106 provides the audio signals 126 to the remote computing resources 114 for performing ASR thereon.

In order to identify the defined word or phrase 130, the speech-recognition engine 127 performs ASR on the generated audio signals and calculates a similarity score between any utterances identified in the audio signals and the defined word or phrase 130. Similar to the speech-recognition engine of the remote computing resources, the speech-recognition engine 127 may use techniques including but not limited to keyword spotting techniques and/or large vocabulary speech recognition to recognize speech and/or determine a similarity score.

Once a similarity score is calculated, the speech-recognition module 112 compares this similarity score to a transition threshold 132 and, if the similarity is greater than the transition threshold 132, the speech-recognition module 112 determines that the user has uttered the defined word or phrase 130. In response, the state transition engine 128 transitions the voice-controlled device 106 from a first state to a second state. For instance, in the second state, the voice-controlled device 106 may begin providing audio signals 126 generated from sound captured within the environment 102 to the remote computing resources 114.

In some instances, the voice-controlled device 106 may alter a value of the transition threshold 132 in response to identifying a defined event. For instance, if the user 104 speaks an utterance having a similarity score that is less than the transition threshold 132 but greater than a minimum threshold 131 (i.e., close to, but not greater than, the transition threshold 132), the speech-recognition module 112 may alter a value of the transition threshold 132 such that it is more or less likely that subsequent speech will exceed the transition threshold 132. The voice-controlled device 106 may additionally or alternatively alter the value of the transition threshold 132 in response to identifying other defined events, such as the voice-controlled device 106 outputting audio to the user 104, the voice-controlled device 106 identifying a particular set of one or more users in the environment 102, the user 104 having recently provided a command to the voice-controlled device 106, or the like. In yet another example, the speech-recognition module 112 may alter the value of the transition threshold 132 based on a time of day, day of the week, season, etc. (e.g., with the values being determined based on usage patterns of the voice-controlled device 106).

As an alternative to altering the value of the transition threshold 132, the voice-controlled device 106 may establish and use a temporary transition threshold 133 that has a value lower or higher than the value of the transition threshold 132 in response to identifying a defined event. For instance, if the user 104 speaks an utterance having a similarity score that is less than the transition threshold 132 but greater than the minimum threshold 131 (i.e., close to, but not greater than, the transition threshold 132), the speech-recognition module 112 may establish and use a temporary transition threshold 133 having a value such that it is more likely that subsequent speech will exceed the temporary transition threshold 133. The voice-controlled device 106 may additionally or alternatively establish and use a temporary transition threshold 133 in response to identifying other defined events, such as the voice-controlled device 106 outputting audio to the user 104, the voice-controlled device 106 identifying a particular set of one or more users in the environment 102, the user 104 having recently provided a command to the voice-controlled device 106, or the like. In yet another example, the speech-recognition module 112 may establish and use a temporary transition threshold 133 based on a time of day, day of the week, season, health of the user, etc. (e.g., with the values being determined based on usage patterns of the voice-controlled device 106). For example, if the user has a cold or sore throat such that it is difficult to understand the user's utterances, the temporary transition threshold 133 may be adjusted while the user is sick to account for the difference and increase the likelihood that a subsequent utterance will exceed the temporary transition threshold 133. As another example, if a defined word or phrase, such as "Help!" is heard but the similarity score is less than the transition threshold 132, the temporary transition threshold 133 may be set very low to ensure that if the defined word or phrase is repeated it will satisfy the temporary transition threshold 133.

In some instances, the speech-recognition module 112 may utilize an algorithm 134 to determine how to alter the value of the transition threshold 132 or to determine the value for the temporary transition threshold 133. For instance, after identifying a defined event (e.g., user speech that is close but not quite equivalent to the defined word or phrase 130), the speech-recognition module 112 may alter the transition threshold 132 by a certain amount (e.g., by a certain percentage, etc.) or establish a temporary transition threshold 133 that has a value that differs from the value of the transition threshold by a certain amount (e.g., by a certain percentage, etc.). The speech-recognition module 112 may then increase the value of the transition threshold 132 or the temporary transition threshold 133 over time according to the algorithm 134. For instance, speech-recognition module may increase the value of the temporary transition threshold 133 over a determined amount of time until the value of the temporary transition threshold 133 equals the value of the transition threshold 132. The algorithm 134 may comprise an algorithm that increases the value linearly, exponentially, in a stair-step manner, or in any other manner.

FIG. 1, for instance, illustrates the user 104 attempting to "wake up" the voice-controlled device 106 by speaking the defined word or phrase 130 "wake up, please." The microphone unit of the voice-controlled device 106 captures the sound including this speech and generates a corresponding audio signal. The speech-recognition module 112 then identifies the utterance within the audio signal and compares this utterance to the defined word or phrase 130. The speech-recognition module 112 also calculates a similarity score between the utterance and the defined word or phrase 130 and compares it to the transition threshold 132.

In this example, the speech-recognition module 112 interprets, at time $T_1$, the utterance from the user as "wake pup peas" rather than "wake up please." In addition, the speech-recognition module 112 calculates a similarity score between the user's utterance and the defined word or phrase 130 and, in this example, determines that the similarity score is less than the transition threshold 132 but greater than the minimum threshold 131. In response, the speech-recognition module 112 establishes a temporary transition threshold 133 with a value that is initially lower than the value of the transition threshold 132 but increases in value over a defined amount of time, t (e.g., five seconds, fifteen seconds, etc.) until it reaches the value of the transition threshold 132.

Establishing and using a temporary transition threshold 133 in this manner increases the probability that a subsequent utterance from the user 104 received within the defined amount of time will result in the subsequent speech exceeding the temporary transition threshold 133 (and, hence, will result in the voice-controlled device 106 transitioning to the second state). In other words, the described techniques are akin to deducing that the first utterance from the user (which was close, but not quite equal to the defined word or phrase) indicates that the user may in fact be attempting to awake the voice-controlled device. As such, the voice-controlled device 106 temporarily lowers the value needed for the similarity score to result in the voice-controlled device transitioning to a second state (i.e., helping the user achieve their presumed goal of waking the voice-controlled device).

Figure 2:
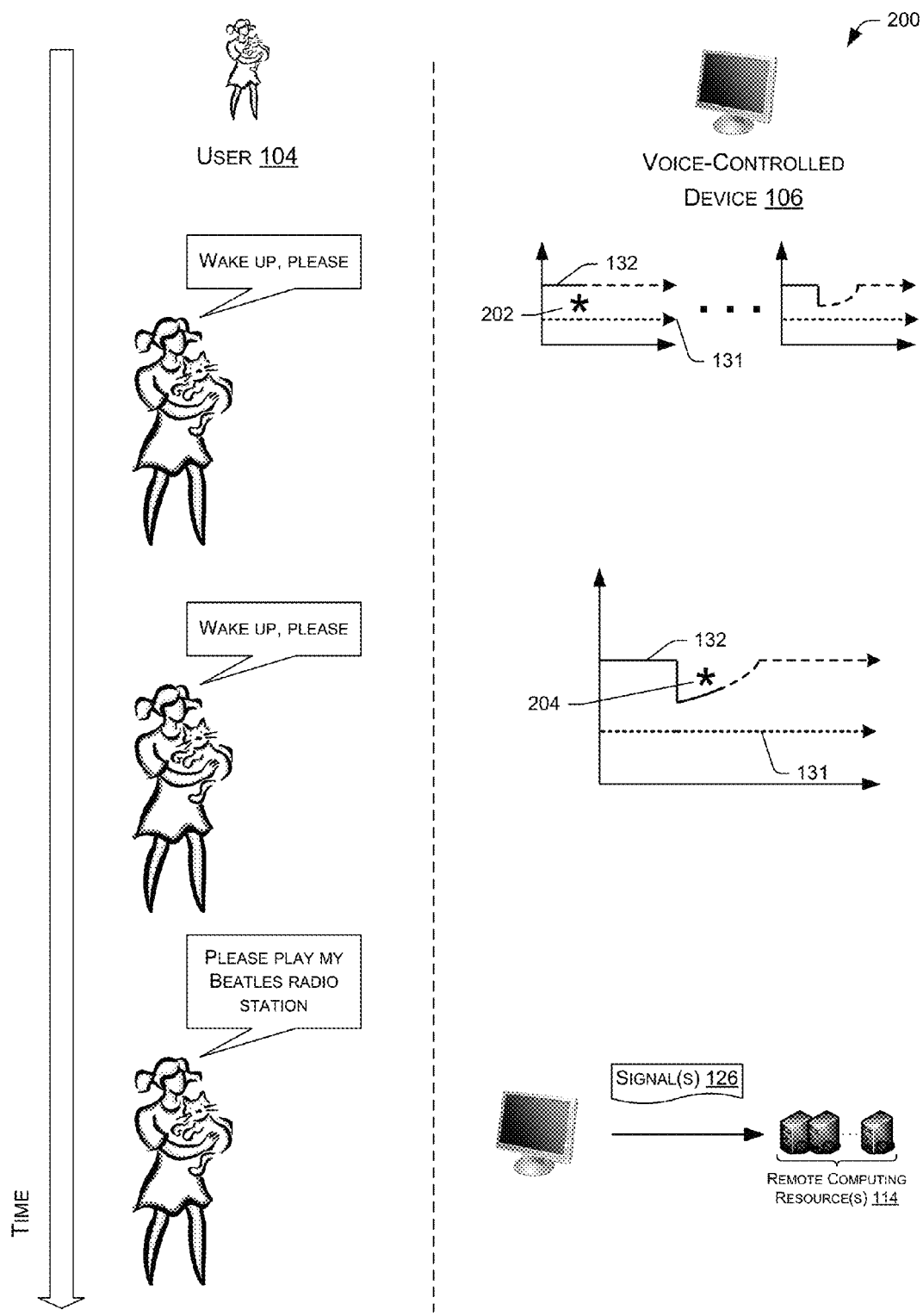
FIG. 2 illustrates an example scenario where the voice-controlled device from FIG. 1 lowers a transition threshold for transitioning the voice-controlled device from a first state to a second state, in accordance with an implementation.

FIG. 2 illustrates an example scenario 200 where the voice-controlled device 106 lowers a value of the transition threshold 132 for transitioning the voice-controlled device 106 from a first state to a second state. While the example scenario 200 describes lowering the value of the transition threshold 132, the same example can be envisioned in which a temporary transition threshold is established and used at the lower value.

At a first time, the user 104 utters the phrase "wake up, please." Like the example described above with reference to FIG. 1, even though the user has uttered the defined word or phrase 130, the voice-controlled device 106 calculates a similarity score between the user's spoken utterance and a representation of the defined word or phrase 130 that is less than the transition threshold 132 but greater than the minimum threshold 131. The value of this similarity score is indicated at 202. Because the calculated similarity score was between the transition threshold 132 and the minimum threshold 131, the voice-controlled device 106 lowers the value of the transition threshold by some amount.

Subsequently, the user 104 again utters the phrase "wake up, please." In this instance, the voice-controlled device 106 calculates a similarity score between this utterance and the representation of the defined word or phrase 130 that is greater than the lowered transition threshold value, but still less than the initial value of the transition threshold 132, as indicated at 204. As such, FIG. 2 illustrates that the voice-controlled device 106 transitions to the second state, meaning that the voice-controlled device 106 begins streaming or communicating audio signals generated by the voice-controlled device 106 to the remote computing resources 114. For instance, in this example the user 104 provides a voice command to the voice-controlled device stating "Please play my Beatles radio station." After capturing this sound and generating a corresponding audio signal, the voice-controlled device 106 provides the audio signal 126 for processing by the remote computing resources 114.

In some instances, the voice-controlled device 106 may also determine a similarity score between received user utterances. For instance, in the example above, the voice-controlled device 106 may determine a similarity between the user's first utterance ("wake up please") and the user's second utterance ("wake up please"). Although the user stated the same phrase in this example, the voice-controlled device 106 likely recognizes each phrase slightly differently. After calculating the similarity score between these two user utterances, the voice-controlled device 106 may compare this similarity score to the same transition threshold, or another threshold. In some instances, the voice-controlled device 106 may then transition from the first state to the second state based not only upon the similarity score between the second utterance and the defined word or phrase 130, but also upon determining that the first and second utterances spoken by the user have a similarity score that also exceeds the reduced transition threshold, and/or a different threshold. In other words, the voice-controlled device 106 may transition from the first state to the second state in response to back-to-back utterances that are determined to be: (1) similar to the representation of the defined word or phrase 130, and/or (2) similar to one another.

Figure 3:
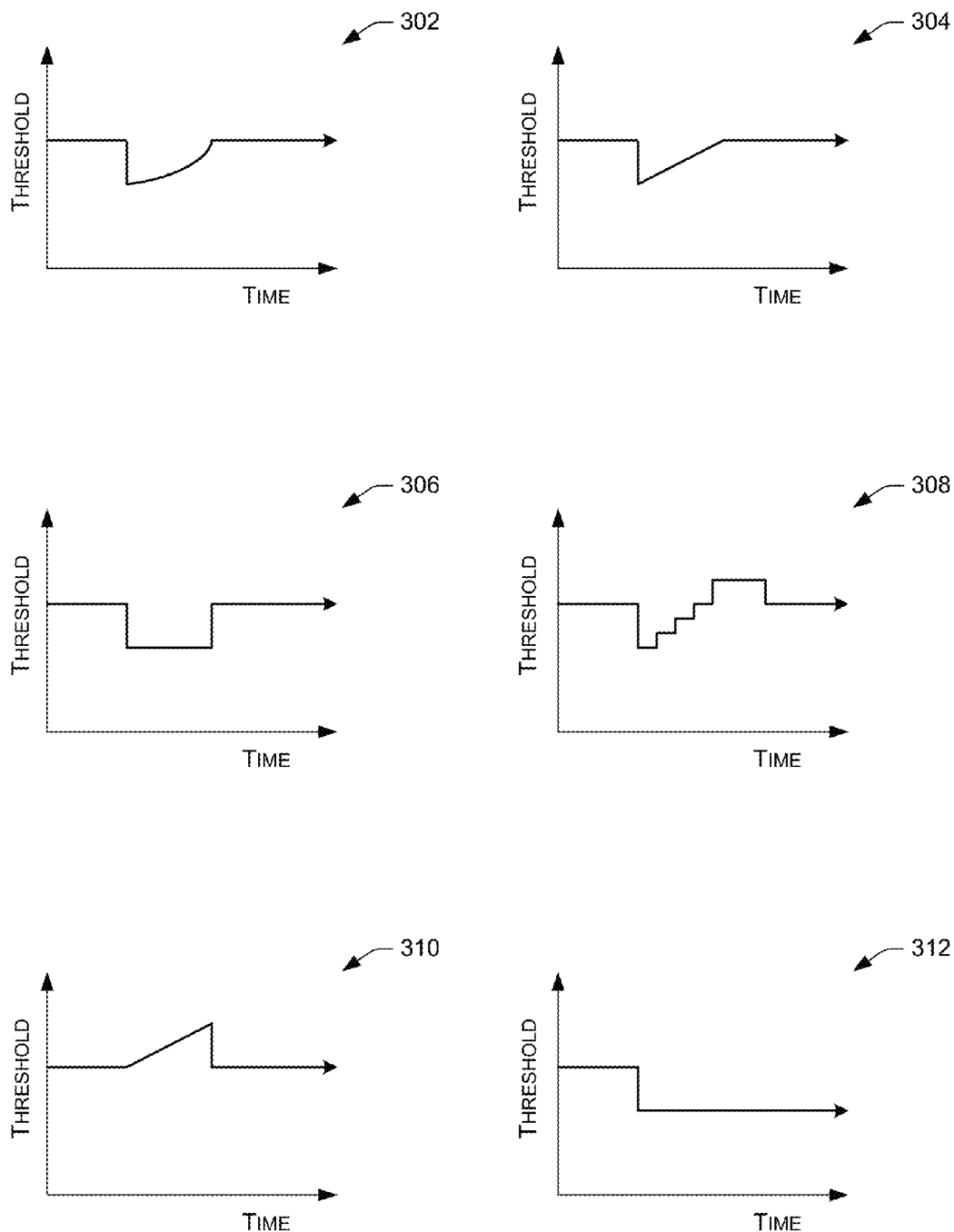
FIG. 3 illustrates several example manners in which a transition threshold may be altered, in accordance with an implementation.

FIG. 3 illustrates several example manners in which a transition threshold may be altered over time, in accordance with an implementation. The example transition threshold 302 illustrates that a value of the transition threshold may be lowered upon identifying a defined event, such as a similarity score based on a comparison of the user's utterance and the defined word or phrase being between the transition threshold and a minimum threshold. Thereafter, the value of the transition threshold increases over a defined amount of time in an exponential manner until reaching the initial value of the transition threshold. As an alternative, upon identifying the defined event, rather than lowering the value of the transition threshold, a temporary transition threshold may be established and used at the lower value. The value of the temporary transition threshold may then be increased over the defined amount of time until it reaches the value of the transition threshold. In such an example, the voice-controlled device 106 may use the value of the temporary transition threshold to determine whether to transition the voice-controlled device between states. Once the value of the temporary transition threshold returns to the value of the transition threshold, the temporary transition threshold may be removed and the voice-controlled device 106 may return to using the transition threshold.

For ease of discussion, the other example transition thresholds discussed with respect to FIG. 3 will only be described with respect to altering the value of the transition threshold. However, it will be appreciated that the same examples and uses of the implementations described herein may be performed by establishing and using a temporary transition threshold.

Returning to FIG. 3, the example transition threshold 304 illustrates that the value of the transition threshold may be lowered upon identifying a defined event and, thereafter, the value may increase linearly until reaching the initial value of the transition threshold. The example transition threshold 306 illustrates that the value of the transition threshold may be lowered upon identifying a defined event, and may remain at this lowered level until the defined amount of time elapses. Once the defined amount of time has elapsed, the value of the transition threshold may return to the initial value.

The example transition threshold 308 illustrates that the value of the transition threshold may be lowered upon identifying a defined event and may thereafter increase in a stair-step manner. This example also illustrates that the value of the transition threshold may actually increase until it is greater than the initial value, and may then eventually decrease back down to the initial value of the transition threshold. Next, the example transition threshold 310 actually increases (e.g., linearly) upon identification of a defined event, before returning to the initial value once the defined amount of time has elapsed. Finally, the example transition threshold 312 illustrates a scenario where the value of the transition threshold is lowered upon identifying a defined event, with the value of the transition threshold remaining at this lowered value indefinitely or for an extended period of time. Of course, while a few example transition thresholds have been illustrated and discussed, it is to be appreciated that the value of the transition threshold may be altered upwards and/or downwards in any other manner.

Figure 4:
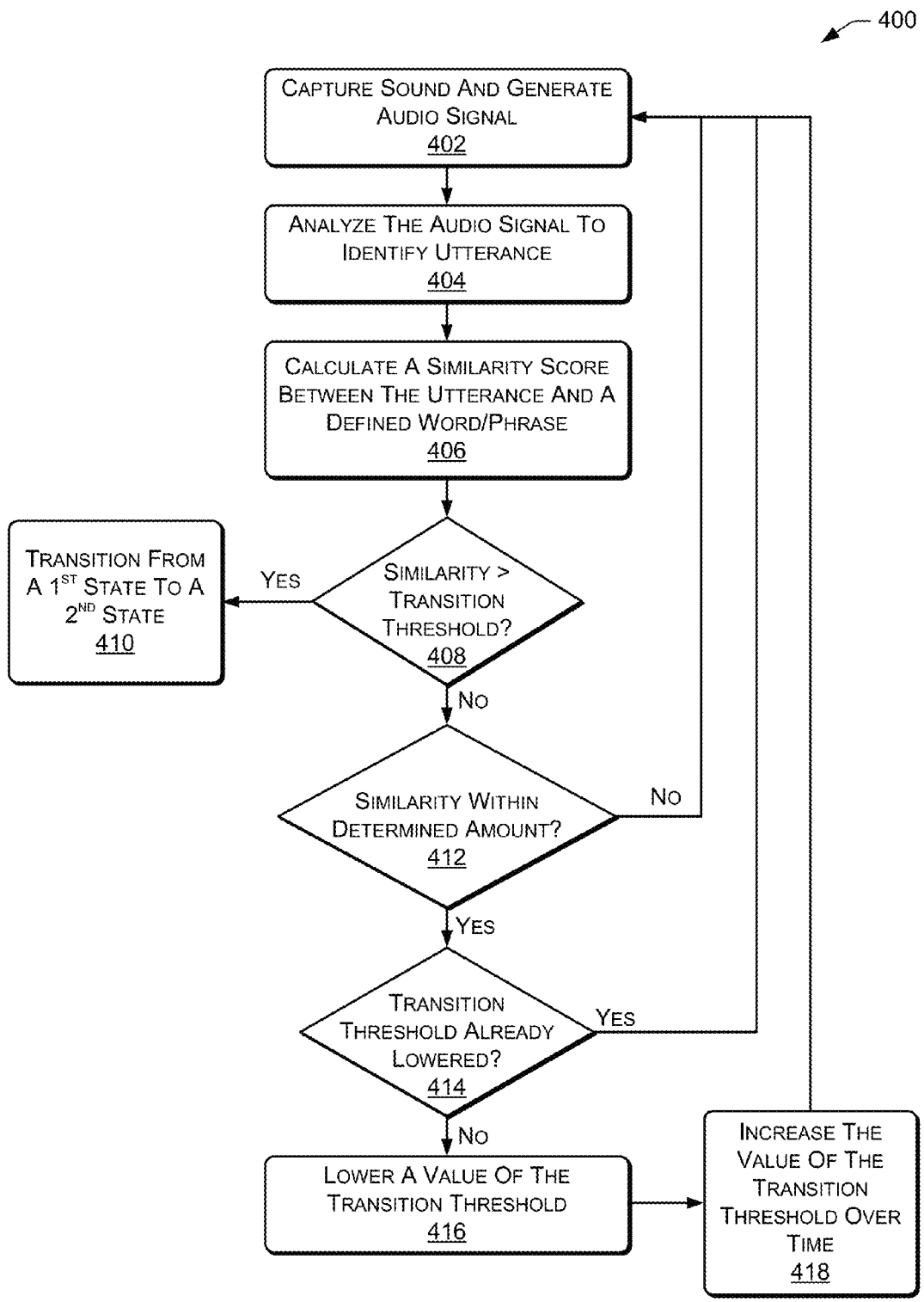
FIG. 4 illustrates an example flow diagram of a process for lowering a transition threshold for transitioning a voice-controlled device from a first state to a second state, in accordance with an implementation.

FIG. 4 illustrates an example flow diagram of a process 400 for lowering a transition threshold for transitioning a voice-controlled device from a first state to a second state in response to a user utterance being interpreted as close, but not quite equivalent to, a defined word or phrase, in accordance with an implementation. In some instances, the voice-controlled device 106 performs this process, although other computing devices or combinations thereof may perform some or all of the operations described below.

The process 400 (and each process described herein) is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

At 402, the process 400 captures and/or receives sound from an environment and generates a corresponding audio signal. At 404, the process 400 analyzes the audio signal to identify an utterance therein. At 406, the process 400 calculates a similarity score between the identified utterance and a defined word or phrase. At 408, the process 400 determines whether the similarity score is greater than a transition threshold. If so, then at 410 the process 400 transitions the voice-controlled device from a first state to a second state.

If the similarity score is not greater than the transition threshold, then at 412 the process 400 determines whether the similarity score is within a determined range of the transition threshold. Many techniques may be used to determine if the similarity score is within a determined amount of the transition threshold. For example, it may be determined that the similarity score is within a determined amount of the transition threshold based on a percentage (e.g., within 10% of the transition threshold), based on a distance or value from the transition threshold, etc. In some implementations, a minimum threshold may be established and the similarity score may be determined to be within the determined amount of the transition threshold if it exceeds the value of the minimum threshold.

If it is determined that the similarity score is not within a determined amount of the transition threshold, the process returns to 402. If it is determined that the similarity score is within the determined amount of the transition threshold, then at 414 the process 400 determines, in some implementations, whether the value of the transition threshold is already lowered (i.e., the process 400 has already completed once and lowered the value of the transition threshold). If it is determined that the value of the transition threshold is already lowered, the process 400 may return to 402. If the value of the transition threshold is not already lowered, then at 416 the process 400 lowers the value of the transition threshold. At 418, the process 400 begins increasing this value over time or at some defined time. For instance, the process 400 may linearly, exponentially, or otherwise increase the lowered value of the transition threshold back to its initial value or to another value. The process 400 then returns to 402 for capturing sound, generating corresponding audio signals, and analyzing the audio signals as described above.

As discussed above, rather than altering the transition threshold (block 416, 418), in some implementations, a temporary transition threshold may be established and adjusted. In such an implementation, at block 414 a determination may be made as to whether a temporary transition threshold is being used. Likewise, at block 416, rather than lowering the value of the transition threshold, a temporary transition threshold may be established and used and then at block 418 the value of the temporary transition threshold may be increased over time.

Figure 5:
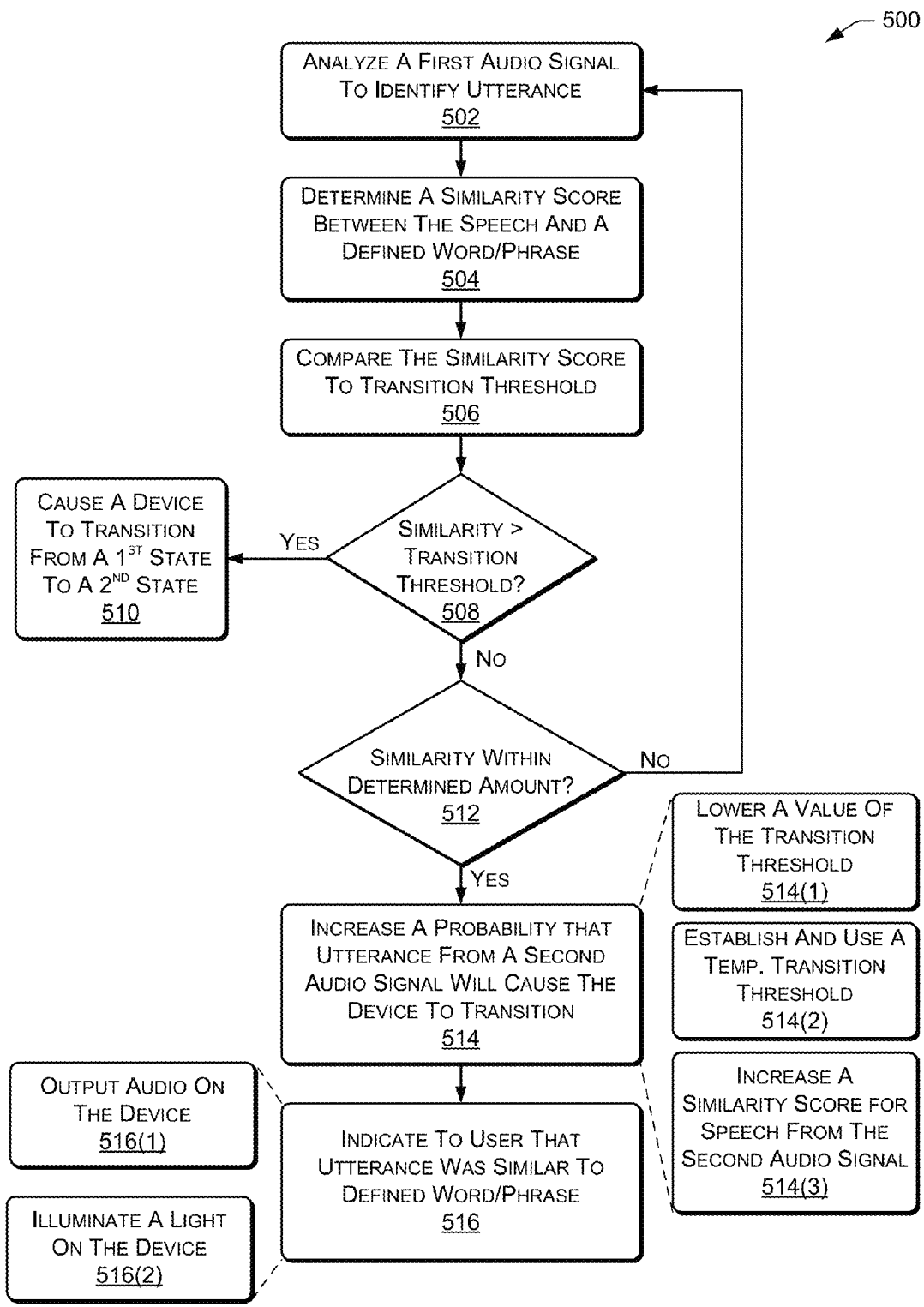
FIG. 5 illustrates an example flow diagram of a process for increasing the probability that speech from a user will result in transitioning a voice-controlled device from a first state to a second state, in accordance with an implementation.

FIG. 5 illustrates an example flow diagram of a process 500 for increasing the probability that an utterance from a user will result in transitioning a voice-controlled device from a first state to a second state. In this example, the probability is increased in response to the utterance being interpreted as close, but not quite equivalent to, a defined utterance.

At 502, the process 500 analyzes a first audio signal to identify an utterance therein. At 504, the process 500 determines a similarity score between the utterance and a representation of a defined word or phrase. The similarity score may be any number or other identifier that is used to illustrate a level of similarity between the defined word or phrase and the utterance. For example, the similarity score may indicate that the utterance and the defined word or phrase are acoustically similar in that they comprise the same or similar sounding phonemes. The similarity score may be calculated using techniques including, but not limited to, keyword spotting techniques and large vocabulary speech-recognition. For example, a keyword spotting technique may generate a similarity score by comparing the utterance to a model, such as a hidden Markov model (HMM), representing the defined word or phrase. A hidden Markov model may comprise a sequence of states and the states may be further modeled with one or more Gaussian mixture models. Features may be extracted from the utterance (such as mel-frequency cepstral coefficients or perceptual linear prediction features) and these features may be aligned with the states of the hidden Markov model using a Viterbi algorithm to produce a similarity score.

At 506, the process 500 determines whether this similarity score is greater than a transition threshold. If it is determined at 508 that the similarity score is greater than the transition threshold, at 510 the process 500 causes a voice-controlled device to transition from a first state to a second state. However, if it is determined that the similarity score is not greater than the transition threshold, at 512 the process 500 determines whether the similarity score is within a determined amount. Many techniques may be used to determine if the similarity score is within a determined amount of the transition threshold. For example, it may be determined that the similarity score is within a determined amount of the transition threshold based on a percentage (e.g., within 10% of the transition threshold), based on a distance or value from the transition threshold, etc. In some implementations, a minimum threshold may be established and the similarity score may be determined to be within the determined amount of the transition threshold if the similarity score exceeds the value of the minimum threshold.

If it is determined that the similarity score is not within a determined or defined amount of the transition threshold, the process 500 may return to 502. If it is determined that the similarity score is within a determined amount of the transition threshold, at 514 the process 500 may increase a probability that an utterance from a second, subsequent audio signal will cause the voice-controlled device to transition from the first state to the second state. This may include lowering a value of the transition threshold, as illustrated at 514(1), establishing and using a temporary transition threshold, as illustrated at 514(2), and/or increasing a similarity score of the speech from the second audio signal, as illustrated at 514(3).

At 516, the process 500 may also indicate to the user that the utterance was received and determined to be similar to the defined word or phrase but not similar enough to transition the voice-controlled device from a first state to a second state. For instance, at 516(1) the process 500 may output audio from the voice-controlled device to effectively indicate that the voice-controlled device received the utterance from the user and believes that the user may be attempting to instruct the voice-controlled device to transition from the first state to the second state but wants a confirmation by the user repeating the utterance. Alternatively or additionally, at 516(2) the process 500 may illuminate a light or indicator on the voice-controlled device to provide the same indication.

As described above, the voice-controlled device 106 may increase a probability that a subsequent user utterance will result in the voice-controlled device transitioning between states based on the voice-controlled device 106 identifying a defined event. The defined event may comprise a user speaking an utterance that is close, but not quite equivalent to, a defined word or phrase, the voice-controlled device outputting audio within the environment, the voice-controlled device determining that a particular set of user(s) is in the environment, a time of day, or the like.

Figure 6:
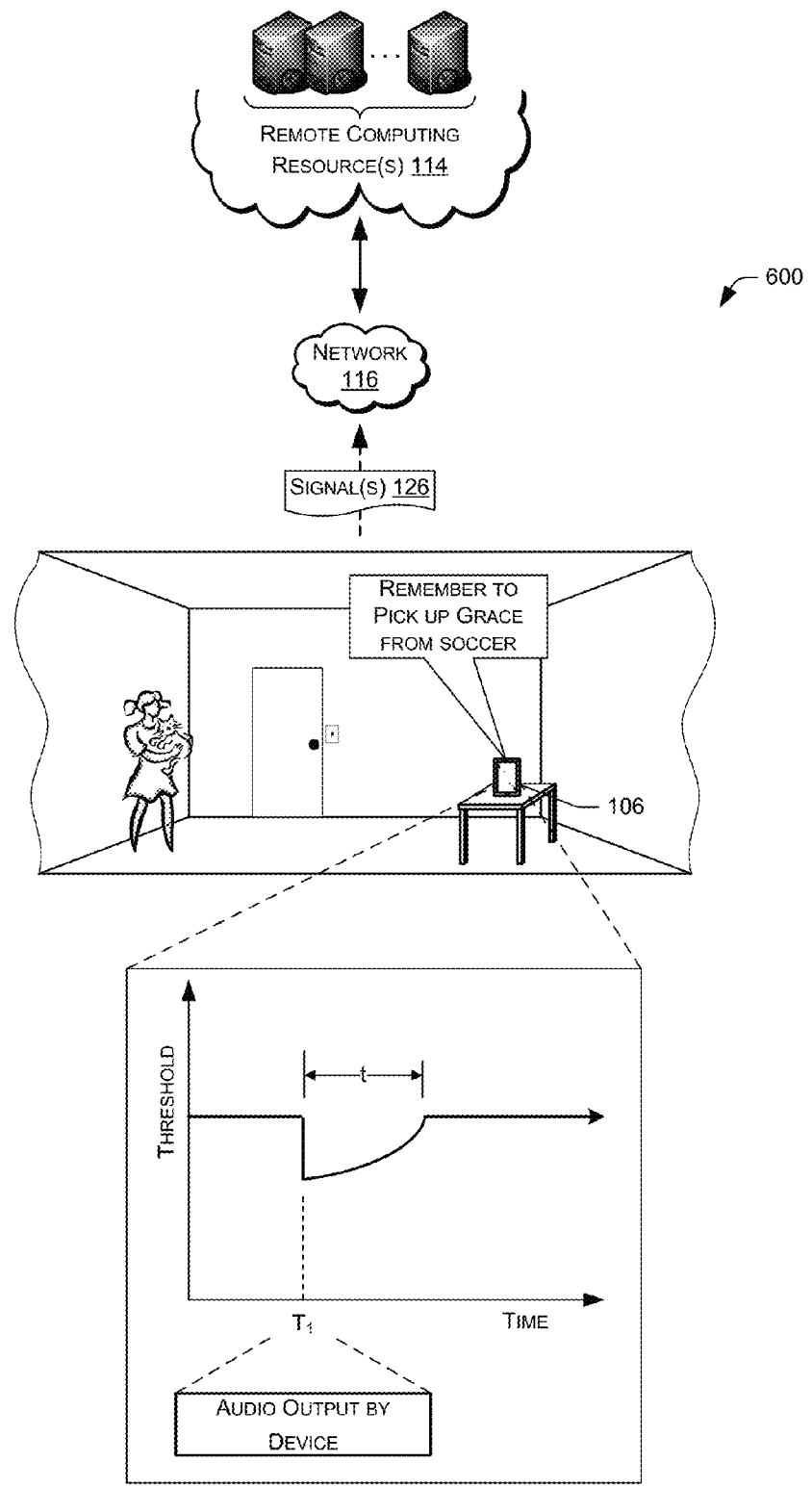
FIG. 6 illustrates an example scenario where a voice-controlled device modifies a transition threshold for transitioning the voice-controlled device from a first state to a second state in response to the voice-controlled device outputting audio to the user, in accordance with an implementation.

FIG. 6 illustrates an example scenario 600 where the voice-controlled device 106 lowers a transition threshold for transitioning the voice-controlled device from a first state to a second state in response to the voice-controlled device 106 outputting audio to the user, in accordance with an implementation. As illustrated, in this example the voice-controlled device 106 outputs via its speakers the following reminder: "Remember to pick Grace up from soccer." In some instances, the remote computing resources 114 provide an instruction to the voice-controlled device 106 to output this reminder based on a user having previously set up the reminder. When the voice-controlled device 106 receives this instruction, the voice-controlled device 106 may not only output the audio, but may also lower the transition threshold for transitioning the voice-controlled device 106 between states, given that it may be more likely that a user within the environment will attempt to "wake up" or otherwise respond to the voice-controlled device 106 in response to the voice-controlled device 106 outputting audio to the user.

Figure 7:
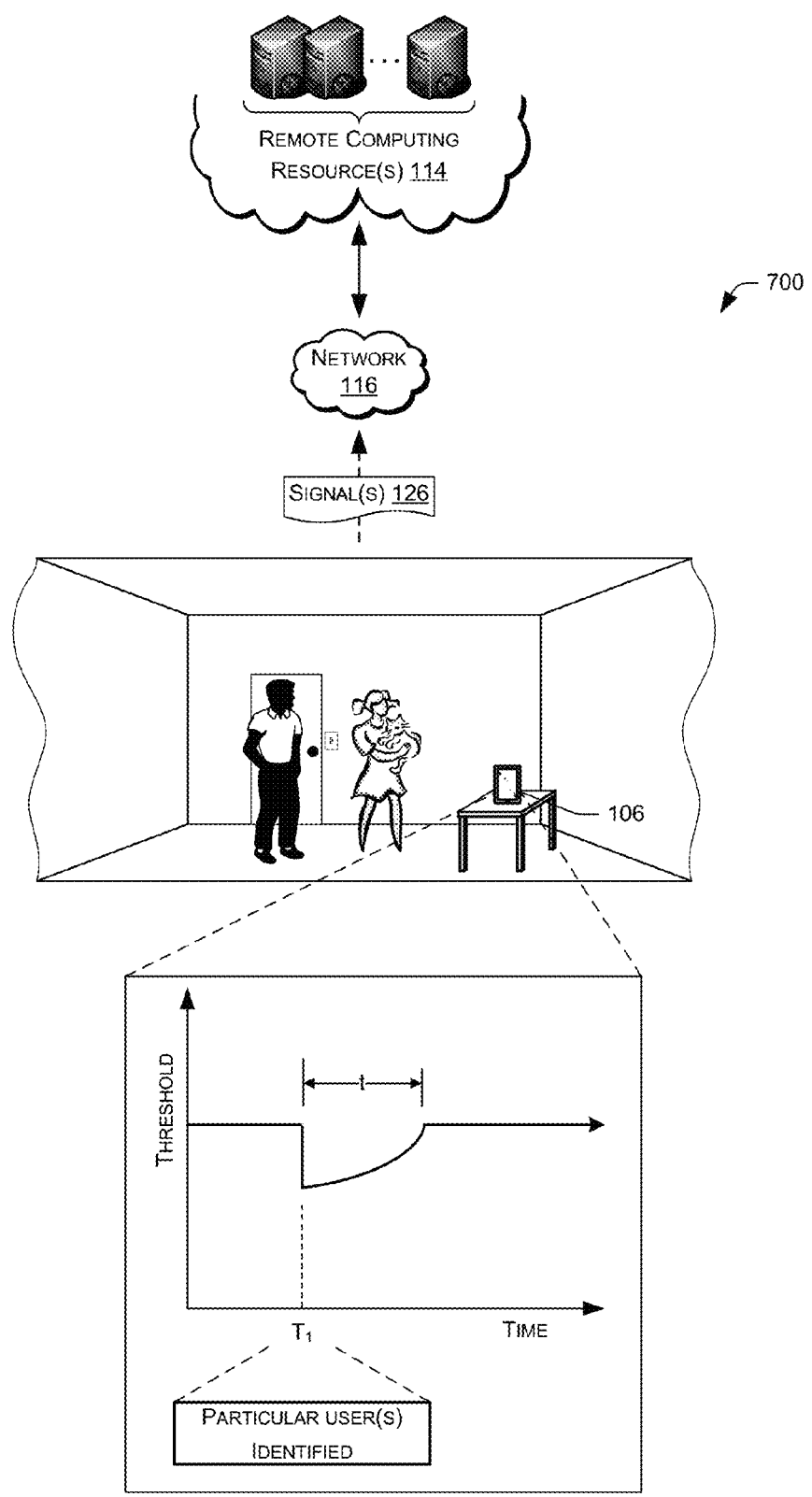
FIG. 7 illustrates an example scenario where a voice-controlled device modifies a transition threshold for transitioning the voice-controlled device from a first state to a second state in response to the voice-controlled device identifying a particular group of users proximate to the voice-controlled device, in accordance with an implementation.

FIG. 7 illustrates an example scenario 700 where the voice-controlled device lowers a transition threshold for transitioning the voice-controlled device 106 from a first state to a second state in response to the voice-controlled device 106 identifying a particular group of users proximate to the voice-controlled device 106, in accordance with an implementation. As illustrated, at time $T_1$ the voice-controlled device 106 identifies (e.g., via audio recognition techniques, facial recognition techniques, username/password authentication, or the like) the presence of two users within the environment 102. In response, the voice-controlled device 106 may alter a value of the transition threshold. While in this example the voice-controlled device 106 lowers the value of the transition threshold for some amount of time, in other examples the voice-controlled device 106 may raise the value of the transition threshold. Furthermore, in some instances the voice-controlled device 106 may keep the transition threshold at the altered value until identification of another defined event.

In still other instances, in addition to detecting an individual within the environment, the voice-controlled device 106 may determine a distance between the individual(s) and the voice-controlled device and optionally modify the transition threshold value based on the determined distance. For example, if the distance is large, the value of the transition threshold may be reduced a larger percentage to account of the distance.

In some instances, the voice-controlled device 106 may alter the value of the transition threshold based upon an identification of particular users. For instance, a first particular user may have configured the voice-controlled device 106 to set a first value of the transition threshold when the first user is in the environment 102, while a second user may have configured the voice-controlled device 106 to set a second, different value when the second user is in the environment. In other instances, the voice-controlled device 106 may be configured to alter the value of the transition threshold based on a number of users within the environment 102. In still other examples, the voice-controlled device 106 may be configured to not respond to or accept commands from some individuals. For example, if a child enters the room, the voice-controlled device may be configured to not receive commands from the child. The voice-controlled device may also be configured to perform or not perform other actions when certain individuals (e.g., children) are present.

Figure 8:
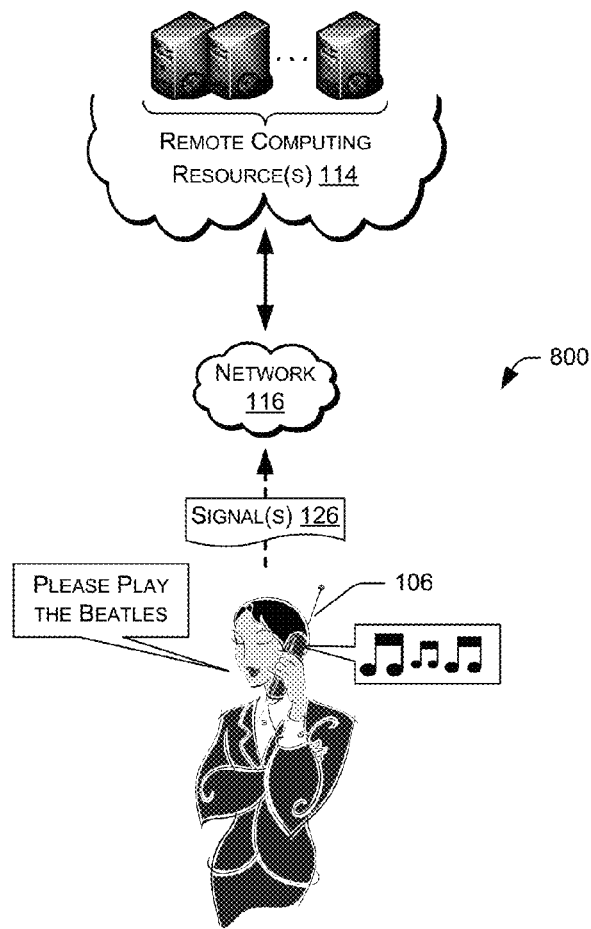
FIG. 8 illustrates an example scenario where a voice-controlled device modifies a transition threshold for transitioning the voice-controlled device from a first state to a second state based on a user having recently provided a command to the voice-controlled device, in accordance with an implementation.
Figure 8:
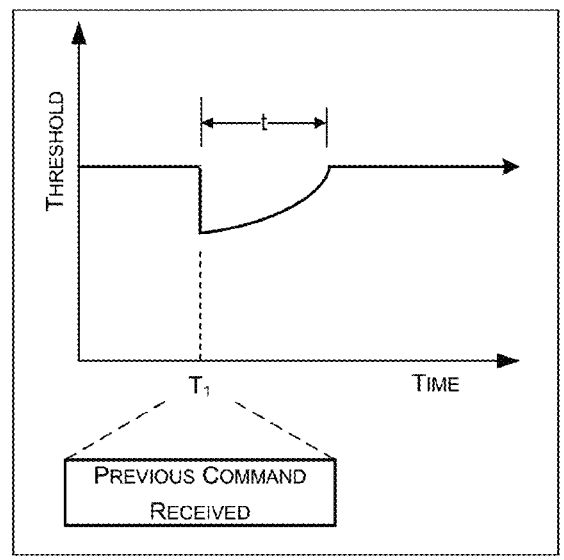

FIG. 8 illustrates an example scenario 800 where the voice-controlled device 106 lowers a transition threshold for transitioning the voice-controlled device from a first state to a second state based on a user having recently provided a command to the voice-controlled device 106, in accordance with an implementation. In this example, the user provides the voice command "please play the Beatles." In response, the voice-controlled device 106 begins outputting corresponding audio within the environment 102. In addition, the voice-controlled device 106 may lower a value of the transition threshold. In some instances, the presence of recently received commands may indicate a greater likelihood that a user will subsequently attempt to wake up and interact with the voice-controlled device 106.

Figure 9:
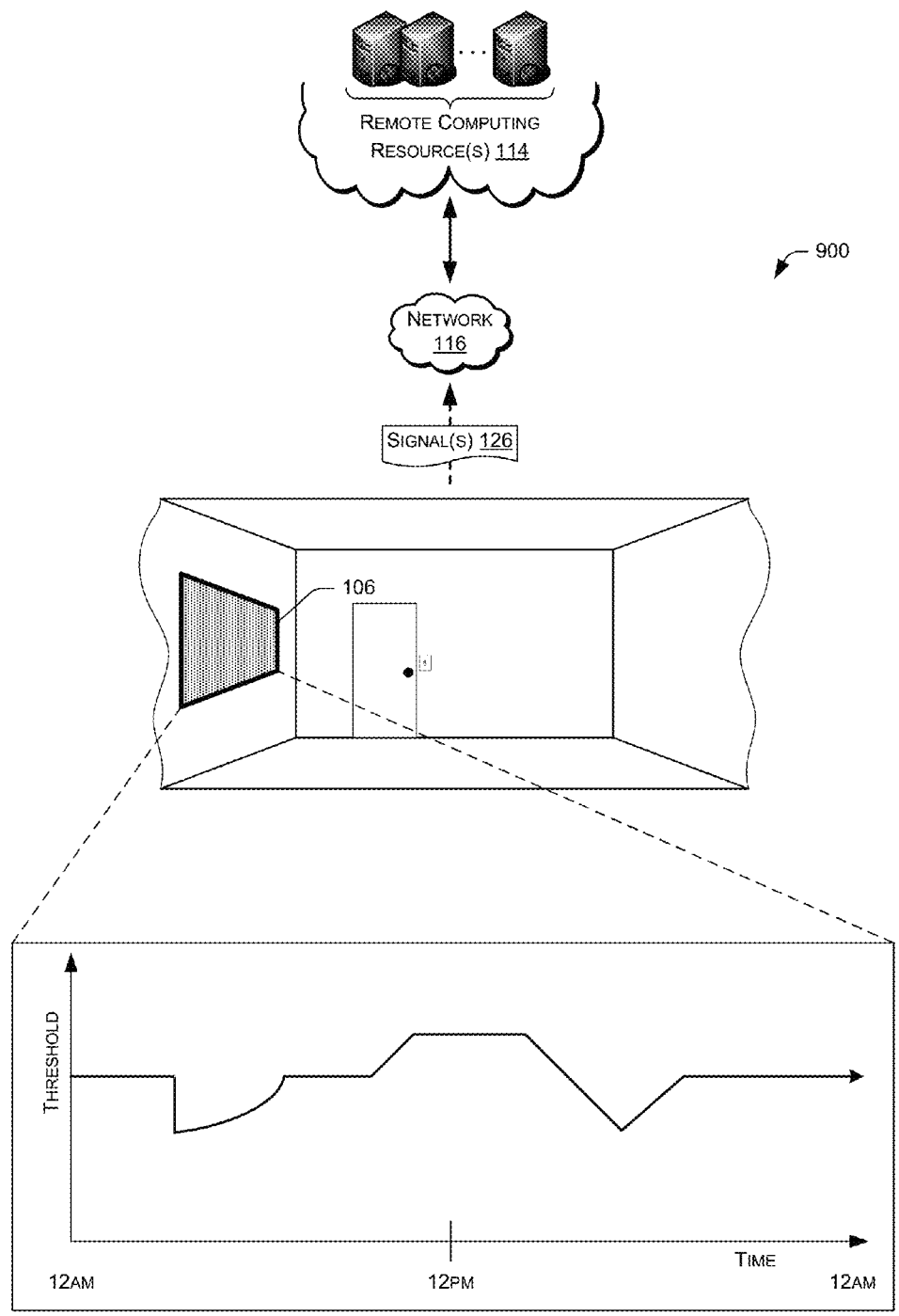
FIG. 9 illustrates an example scenario where a voice-controlled device modifies a transition threshold for transitioning the voice-controlled device from a first state to a second state based on previous interactions with users in the environment, in accordance with an implementation.

FIG. 9 illustrates an example scenario 900 where the voice-controlled device 106 alters a transition threshold for transitioning the voice-controlled device 106 from a first state to a second state throughout the day based on previous interactions with users in the environment, in accordance with an implementation. That is, the scenario 900 illustrates that the voice-controlled device 106 may utilize different transition threshold values, or different transition thresholds, throughout the day based on previous usage patterns of the voice-controlled device 106 by users within the environment. The voice-controlled device 106 may similarly vary the value of the transition threshold based on days, seasons, or the like.

Figure 10:
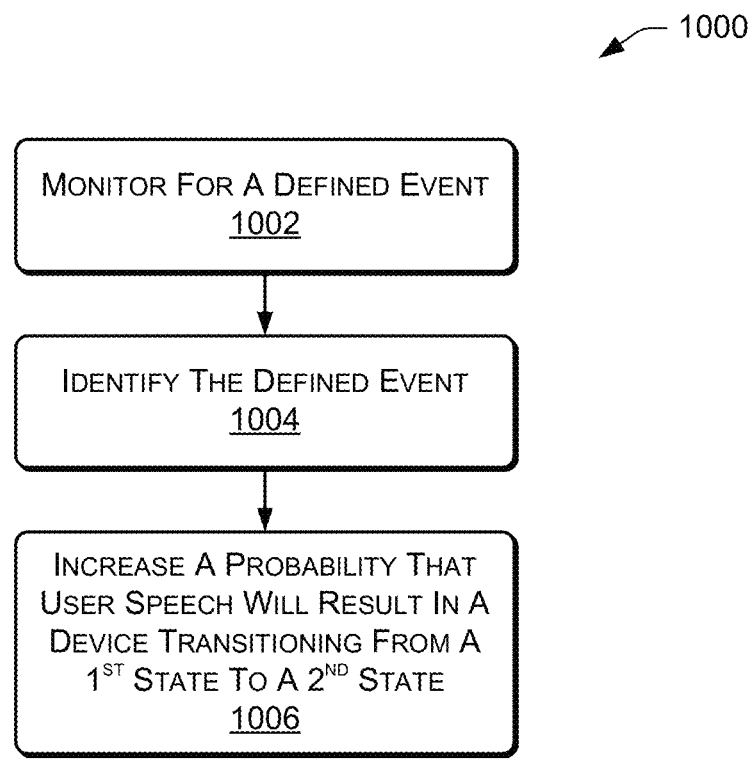
FIG. 10 illustrates a flow diagram of an example process for monitoring for a defined event and, in response to identifying the defined event, transitioning a voice-controlled device from a first state to a second state, in accordance with an implementation.

FIG. 10 illustrates a flow diagram of an example process 1000 for monitoring for a defined event and, in response to identifying the defined event, transitioning a voice-controlled device from a first state to a second state, in accordance with an implementation. At 1002, the process 1000 monitors for a defined event, such as one or more of the defined events described above. At 1004, the process 1000 identifies the defined event. In response, and at 1006, the process 1000 increases a probability that user utterance will result in a voice-controlled device transitioning from a first state to a second state. In some instances, this probability may be increased by lowering a transition threshold required for transitioning the voice-controlled device or by increasing a similarity score of the subsequent speech and a defined word or phrase. In other instances, this probability may be increased by establishing and using a temporary transition threshold.

Figure 11:
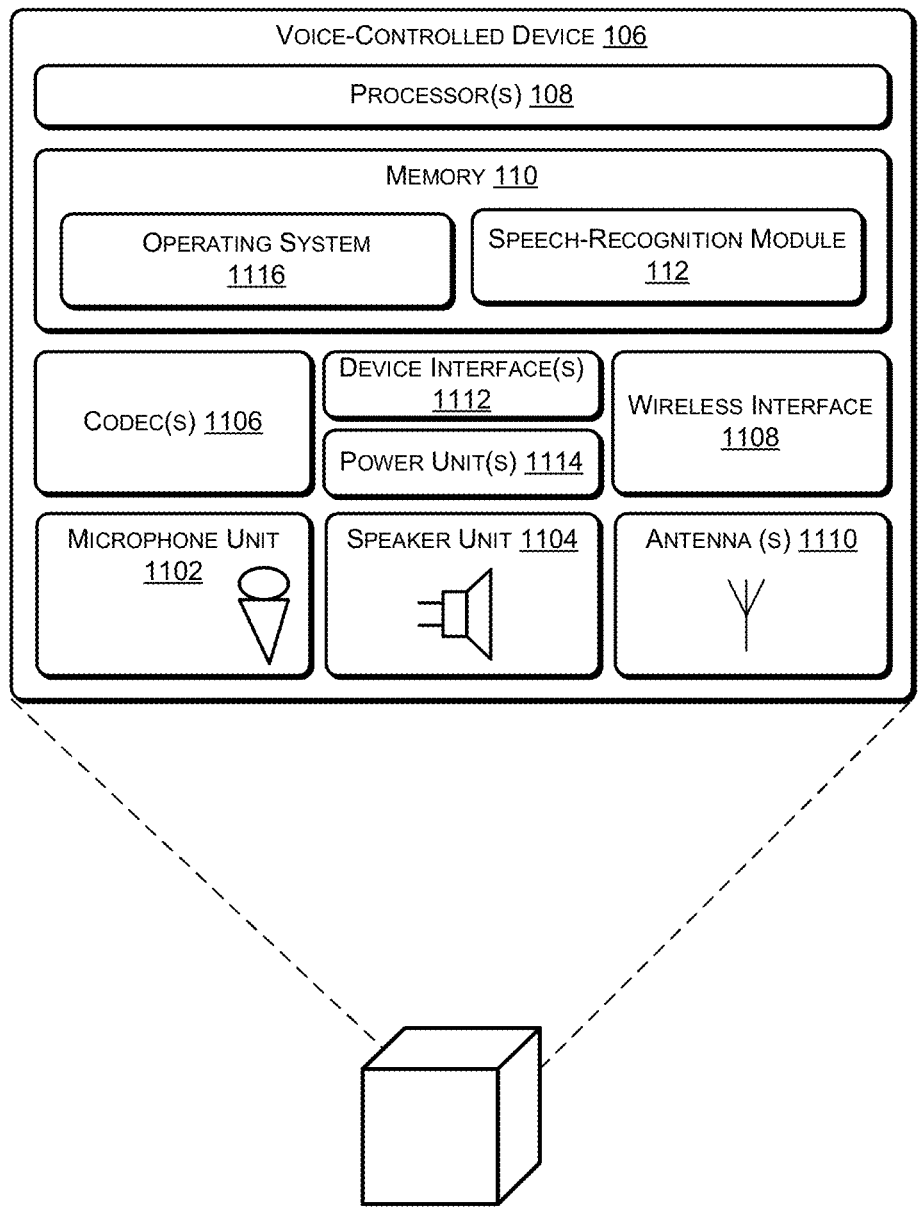
FIG. 11 shows a block diagram of selected functional components in the voice-controlled device of FIG. 1, in accordance with an implementation.

FIG. 11 shows a block diagram of selected functional components implemented in the voice-controlled device 106 of FIG. 1. While this figure illustrates one example voice-controlled device, it is to be appreciated that any other type of client or server computing device may implement the techniques described herein.

Generally, the voice-controlled device 106 may be implemented as a standalone device that is relatively simple in terms of functional capabilities with limited input/output components, memory and processing capabilities. For instance, in one implementation, the voice-controlled device 106 does not have a keyboard, keypad, or other form of mechanical input in some implementations, nor does it have a display or touch screen to facilitate visual presentation and user touch input. Instead, the voice-controlled device 106 may be implemented with the ability to receive and output audio, a network interface (wireless or wire-based), power, and limited processing/memory capabilities.

In the illustrated implementation, the voice-controlled device 106 includes the processor 108 and memory 110. The memory 110 may include computer-readable storage media ("CRSM"), which may be any available physical media accessible by the processor 108 to execute instructions stored on the memory. In one basic implementation, CRSM may include random access memory ("RAM") and flash memory. In other implementations, CRSM may include, but is not limited to, read-only memory ("ROM"), electrically erasable programmable read-only memory ("EEPROM"), or any other medium which can be used to store the desired information and which can be accessed by the processor 108.

The voice-controlled device 106 includes a microphone unit 1102 that comprises one or more microphones to receive audio input, such as user voice input. The voice-controlled device 106 also includes a speaker unit 1104 that includes one or more speakers to output audio sounds. One or more codecs 1106 are coupled to the microphone unit 1102 and the speaker unit 1104 to encode and/or decode the audio signals. The codec 1106 may convert audio data between analog and digital formats. A user may interact with the voice-controlled device 106 by speaking to it and the microphone unit 1102 captures sound and generates an audio signal that includes the user speech (utterance). The codec 1106 encodes the user speech (utterance) and transfers that audio data to other components. The voice-controlled device 106 can communicate back to the user by emitting audible statements through the speaker unit 1104. In this manner, the user interacts with the voice-controlled device 106 simply through speech, without use of a keyboard or display common to other types of devices.

In the illustrated example, the voice-controlled device 106 includes one or more wireless interfaces 1108 coupled to one or more antennas 1110 to facilitate a wireless connection to a network. The wireless interface 1108 may implement one or more of various wireless technologies, such as wifi, Bluetooth, RF, and so on.

One or more device interfaces 1112 (e.g., USB, broadband connection, etc.) may further be provided as part of the voice-controlled device 106 to facilitate a wired connection to a network, or a plug-in network device that communicates with other wireless networks. One or more power units 1114 are further provided to distribute power to the various components on the voice-controlled device 106.

The voice-controlled device 106 is designed to support audio interactions with the user, in the form of receiving voice commands (e.g., words, phrase, sentences, etc.) from the user and outputting audible feedback to the user. Accordingly, in the illustrated implementation, there are no or few haptic input devices, such as navigation buttons, keypads, joysticks, keyboards, touch screens, and the like. Further there is no display for text or graphical output. In one implementation, the voice-controlled device 106 may include non-input control mechanisms, such as basic volume control button(s) for increasing/decreasing volume, as well as power and reset buttons. There may also be one or more simple indicators or light elements (e.g., LEDs around perimeter of a top portion of the voice-controlled device) to indicate a state such as, for example, when power is on or to effectively indicate when the voice-controlled device 106 believes that the user may be attempting to cause the voice-controlled device 106 to transition between device states. But, otherwise, the voice-controlled device 106 does not use or need to use any input devices or displays in some instances.

Several modules such as instruction, datastores, and so forth may be stored within the memory 110 and configured to execute on the processor 108. An operating system module 1116 is configured to manage hardware and services (e.g., wireless unit, Codec, etc.) within and coupled to the voice-controlled device 106 for the benefit of other modules. In addition, the memory 110 may include the speech-recognition module 112, described above, amongst other modules. Some or all of these modules, data stores, and components may reside additionally or alternatively at the remote computing resources 114 (FIG. 1).

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. An apparatus comprising:
   a microphone;
   a processor; and
   computer-readable media storing computer-executable instructions that, when executed by the processor, cause the processor to perform acts comprising:
      receiving, from the microphone, a first audio signal including a representation of a first utterance;
      determining a first similarity score for the first utterance, wherein the first similarity score indicates a similarity between the representation of the first utterance and a representation of a defined word or phrase;
      determining that the first similarity score is less than a first similarity threshold and greater than a second similarity threshold;
      setting a temporary third similarity threshold for a defined amount of time, wherein the third similarity threshold is less than the first similarity threshold and greater than the second similarity threshold;
      receiving, from the microphone and within the defined amount of time, a second audio signal including a representation of a second utterance;
      causing speech-recognition to be performed on the second audio signal;
      determining a second similarity score for the second utterance, wherein the second similarity score indi- cates a similarity between the representation of the second utterance and the representation of the defined word or phrase;

determining that the second similarity score is greater than the third similarity threshold; and in response to the determining that the second similarity score is greater than the third similarity threshold, changing a state of the apparatus from a first state to a second state.

2. The apparatus as recited in claim 1, the acts further comprising:

linearly or exponentially increasing the third similarity threshold to the first similarity threshold over the defined amount of time.

3. The apparatus as recited in claim 1, wherein the apparatus operates with additional functionality in the second state than in the first state.

4. The apparatus as recited in claim 1, wherein:

the first state comprises a state in which the apparatus performs speech-recognition on audio signals to identify the defined word or phrase; and the second state comprises a state in which the apparatus provides additional functionality.

5. The apparatus as recited in claim 4, wherein the additional functionality includes providing audio signals to a remote computing device over a network.

6. A non-transitory computer-readable storage medium storing instructions that when executed by a processor cause the processor to:

receive a first audio signal including a representation of a first utterance;

determine a first similarity score for the first utterance, wherein the first similarity score indicates a similarity between the representation of the first utterance and a representation of a defined word or phrase;

determine that the first similarity score does not satisfy a first similarity acceptance criterion and does satisfy a second similarity acceptance criterion;

modify the first similarity acceptance criterion for a period of time;

receive a second audio signal including a representation of a second utterance within the period of time;

determine a second similarity score for the second utterance, wherein the second similarity score indicates a similarity between the representation of the second utterance and the representation of the defined word or phrase; and change a state of an electronic device based at least in part on a determination that the second similarity score satisfies the modified first similarity acceptance criterion.

7. The non-transitory computer-readable storage medium of claim 6, wherein modifying the first similarity acceptance criterion includes lowering a similarity threshold associated with the first similarity acceptance criterion.

8. The non-transitory computer-readable storage medium of claim 7, the instructions that when executed by the processor further cause the processor to:

increase the similarity threshold over the period of time after lowering the similarity threshold.

9. The non-transitory computer-readable storage medium of claim 6, wherein the first similarity acceptance criterion includes comparing a similarity score to a similarity threshold and wherein modifying the first similarity acceptance criterion includes increasing the similarity score before comparing the similarity score to the similarity threshold.

10. The non-transitory computer-readable storage medium of claim 6, wherein the first similarity score is determined based at least in part on a comparison of the representation of the first utterance and the representation of the defined word or phrase.

11. The non-transitory computer-readable storage medium of claim 6, the instructions that when executed by the processor further cause the processor to:

determine a third similarity score between the first audio signal and the second audio signal, and wherein the state of the electronic device is changed based at least in part on the third similarity score.

12. The non-transitory computer-readable storage medium of claim 6, the instructions that when executed by a processor further cause the processor to:

attenuate audio output by the electronic device at least partly in response to the determination that the first similarity score does not satisfy the first similarity acceptance criterion and does satisfy the second similarity acceptance criterion.

13. The non-transitory computer-readable storage medium of claim 6, the instructions that when executed by the processor further cause the processor to:

cause an indicator of the electronic device to activate at least partly in response to the determination that the first similarity score does not satisfy the first similarity acceptance criterion and does satisfy the second similarity acceptance criterion.

14. The non-transitory computer-readable storage medium of claim 13, wherein activating the indicator includes outputting audio.

15. A method implemented at least in part by an electronic device that is configured to transition from a first state to a second state in response to a received audio signal having a similarity to a representation of a defined word or phrase, the method comprising:

receiving, at the electronic device, the audio signal;

determining an occurrence of an event while the electronic device is in the first state;

modifying a similarity acceptance criterion for a period of time, based at least in part on the occurrence of the event;

determining a similarity score between the audio signal and a representation of a defined word or phrase; and transitioning the electronic device from the first state to the second state based at least in part on a determination that the similarity score satisfies the modified similarity acceptance criterion.

16. The method as recited in claim 15, wherein the event comprises:

receiving the audio signal including a representation of an utterance;

determining a similarity score using:
the representation of the utterance, and
the representation of the defined word or phrase; and determining that the similarity score does not satisfy the similarity acceptance criterion.

17. The method as recited in claim 15, wherein the event comprises the electronic device outputting audio.

18. The method as recited in claim 15, wherein the event comprises determining that a user is within a proximity of the electronic device.

19. The method as recited in claim 15, wherein the event comprises determining that the electronic device has received an input from a user.

20. The method as recited in claim 15, wherein modifying the similarity acceptance criterion for a period of time includes lowering a similarity threshold associated with the similarity acceptance criterion.

21. The method as recited in claim 20, further comprising:
increasing the similarity threshold associated with the similarity acceptance criterion after the lowering and over the period of time.

22. A non-transitory computer-readable media storing computer-executable instructions that, when executed by a processor, cause the processor to perform acts comprising:
receiving an audio signal comprising a representation of an utterance;
monitoring for an occurrence of an event;
at least partly in response to identifying the occurrence of the event, determining a similarity score for the utterance based on a comparison between the representation of the utterance and a representation of a defined word or phrase;
modifying the similarity score;
modifying a similarity acceptance criterion for a period of time; and
transitioning an electronic device from a first state to a second state based at least in part on a determination that the modified similarity score satisfies the modified similarity acceptance criterion.

23. The non-transitory computer-readable media as recited in claim 22, further comprising:
at least partly in response to identifying the occurrence of the event, lowering a similarity threshold associated with the similarity acceptance criterion for a period of time.

24. The non-transitory computer-readable media as recited in claim 22, wherein the electronic device operates with additional functionality in the second state than when in the first state.

25. The non-transitory computer-readable media as recited in claim 24, wherein the first state is a low power state.

26. The non-transitory computer-readable media as recited in claim 22, wherein:
the first state comprises a state in which the electronic device performs speech-recognition to identify the utterance; and
the second state comprises a state in which the electronic device provides additional functionality.

27. The non-transitory computer-readable media as recited in claim 26, wherein the additional functionality includes providing audio signals to a remote computing device over a network.

* * * * *